United States Patent [19]

Lundqvist

[11] Patent Number: 4,844,789
[45] Date of Patent: Jul. 4, 1989

[54] PRESSURE VESSEL WITH ROTATING DISK

[75] Inventor: Kjell U. W. Lundqvist, Karlstad, Sweden

[73] Assignee: Kamyr AB, Karlstad, Sweden

[21] Appl. No.: 213,278

[22] Filed: Jun. 29, 1988

[30] Foreign Application Priority Data

Jul. 3, 1987 [SE] Sweden ............................... 8702740

[51] Int. Cl.[4] ...................... B01D 33/24; B01D 41/04
[52] U.S. Cl. .................................. 210/398; 210/411; 162/261; 209/271
[58] Field of Search ........... 210/240, 253, 254, 321.75, 210/321.84, 107, 334, 390, 398, 411, 422; 162/261; 209/269, 271, 273, 358, 467; 241/220, 222, 244, 245, 246, 247, 294, 295, 296

[56] References Cited

U.S. PATENT DOCUMENTS

| 2,051,079 | 8/1936 | Faber et al. | 210/390 |
| 2,183,578 | 12/1939 | McNeal | 210/107 |
| 2,184,177 | 12/1939 | Burrell | 210/107 |
| 2,382,656 | 8/1945 | Obenshain et al. | 210/398 |
| 4,543,181 | 9/1985 | Greenwood | 209/273 |
| 4,657,636 | 4/1987 | Satomi | 162/261 |
| 4,680,108 | 7/1987 | Ahs | 209/273 |
| 4,699,324 | 10/1987 | Ahs | 241/21 |
| 4,781,825 | 11/1988 | Grimes et al. | 210/107 |

FOREIGN PATENT DOCUMENTS

618316 2/1949 United Kingdom .

OTHER PUBLICATIONS

Kamyr Bulletin, No. 8, Apr., 1949, J. Richter, pp. 1 and 7.
Rydholm, "Continuous Pulping Processes", Special Technical Association Publication, Stap No. 7, copyright 1970, pp. 1 and 2.

Primary Examiner—Richard V. Fisher
Assistant Examiner—Wanda L. Millard
Attorney, Agent, or Firm—Nixon & Vanderhye

[57] ABSTRACT

A slurry of comminuted cellulosic fibrous material (e.g. paper pulp) is acted upon so that particles contained in the slurry are separated out from the slurry and introduced into a second liquid flow, while maintained under superatmospheric pressure. A partition divides a liquid tight pressure resistant vessel into first and second distinct chambers isolated from each other except by a slit at a mid-portion. An inlet for the slurry and an outlet for the first liquid are connected to the first chamber, and an inlet for the second liquid and an outlet for the second slurry to the second chamber. A screening disk is mounted for rotation in the vessel so that it fills the slit, with portions disposed in both the first and second chambers. The screening disk comprises a screen sandwiched between first and second circular plates which have aligned through-extending openings, the openings in the first plate, and the screen, defining pockets in which separated particles are captured for transfer from the first chamber to the second chamber. The first chamber may be much larger than the second chamber so that thickening of the pulp slurry can be accomplished.

16 Claims, 2 Drawing Sheets

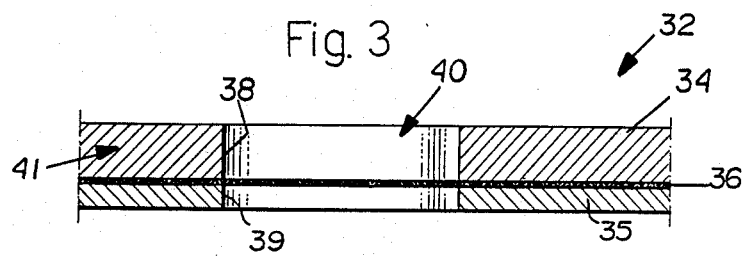
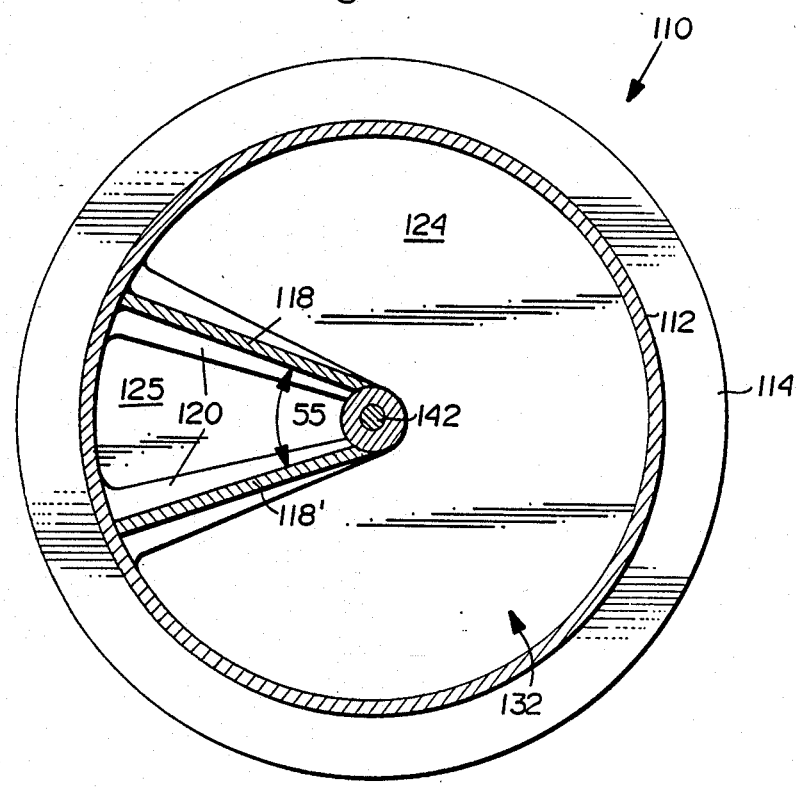

PRESSURE VESSEL WITH ROTATING DISK

BACKGROUND AND SUMMARY OF THE INVENTION

There are a number of circumstances in the treatment of slurries in which it is desirable to transfer praticles of the slurry from a first liquid, to a second liquid. This is particularly so in the pulp and paper art in which slurries of comminuted cellulosic fibrous material are present in a first treatment liquid, and it is desired to transfer the slurry particles to a second treatment liquid.

According to the present invention, a simple apparatus and method are provided for effecting the transfer of particles in a slurry, particularly cellulosic fibrous material particles, from one treatment liquid to another. Not only is the apparatus and method according to the invention simple and easy to construct and practice, the general concepts thereof allow great flexibility so that the concentration of particles in the slurry can be greatly changed during transfer of the particles from the first to the second liquid, allowing the slurry to be thickened or diluted.

According to the method of separating particles from the slurry of the first liquid and the particles, and feeding the particles into a second liquid flow, according to the invention, the following steps are practiced: The slurry of first liquid and particles is caused to flow in a first direction. Particles from the slurry are captured as it flows in the first direction, to separate the particles from the flow. A flow of the second liquid is established in a direction generally opposite to the first direction; and the captured particles are moved into operative association with the flow of the second liquid so that the captured particles are entrained in the second liquid. As mentioned above, the method has particular application to the handling of slurries of comminuted cellulosic fibous material (paper pulp), and in particular switching the slurry particles from one treatment liquid to another, distinct treatment liquid, although the process can also be applied to transferring the particles to a higher or lower pressure flow of the same liquid, or merely as a way of effecting thickening or dilution of the slurry. Alternatively thickening or dilution of the slurry can be accomplished at the same time as the particles are transferred from one treatment liquid to a second distinct treatment liquid.

An exemplary assembly according to the invention includes a liquid tight pressure resistant vessel defining an open interior, with partitions for dividing the open interior into first and second distinct chambers which are isolated from each other except at a slit at amid portion thereof. An inlet for the first liquid slurry and an outlet for the first liquid are operatively connected to the first chamber, while an inlet for the second liquid and outlet for the second liquid with entrained particles is operatively connected to the second chamber. A screening disk screens particles from the first liquid slurry in the first chamber and allows the particles to be entrained by the second liquid flow in the second chamber. The screening disk preferably comprises a generally circular screen sandwiched between first and second circular disk plates having through-extending openings therein, with the openings in the first plate, and the screen, defining pockets in which the particles are captured. This disk is mounted so that it fills the slit in the partition, extending generally transverse to the partition, and is rotatable about an axis generally parallel to the partition. The disk is rotated so that points spaced from the axis thereof move from one chamber to the other during rotation. Flanges associated with the partition in the vessel, and the shape of the pockets and the disk (and the solid areas between the pockets), are designed so that a pocket does not communicate with both chambers at the same time, and little liquid moves from one chamber to the other.

It is the primary object of the present invention to provide for the simple, effective, and versatile transfer of particles from a first liquid to a second liquid. This and other objects of the invention will become clear from an inspection of the detailed description of the invention and from the appended claims.

BRIEF DESCRIPTION OF THE DRAWINGS

FIG. 3 is a detail cross-sectional view taken along lines 3—3 of FIG. 2; and

FIG. 4 is a view like that of FIG. 2 only showing a second embodiment of the assembly.

DETAILED DESCRIPTION OF THE DRAWINGS

Figure 1:
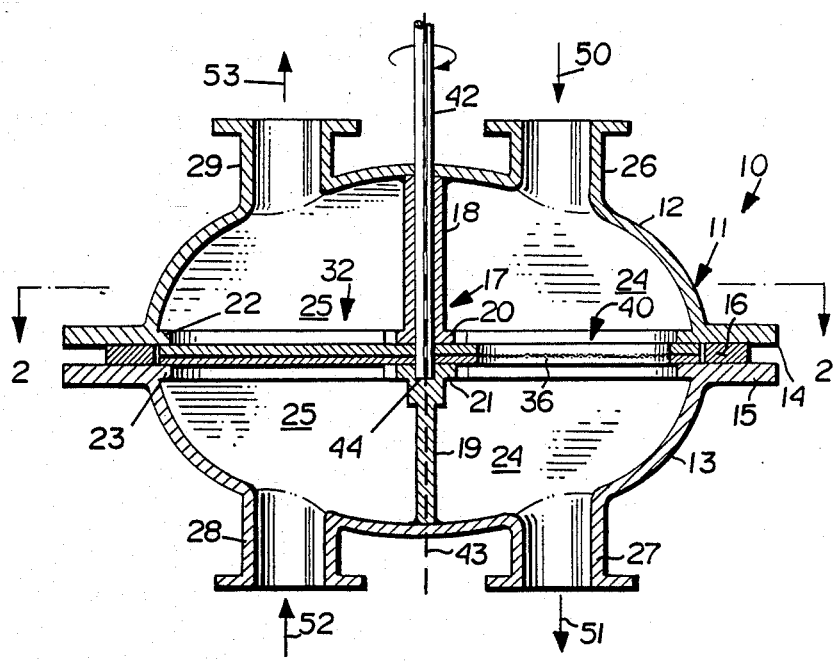
FIG. 1 is a side cross-sectional view of an exemplary assembly according to the present invention.
Figure 2:
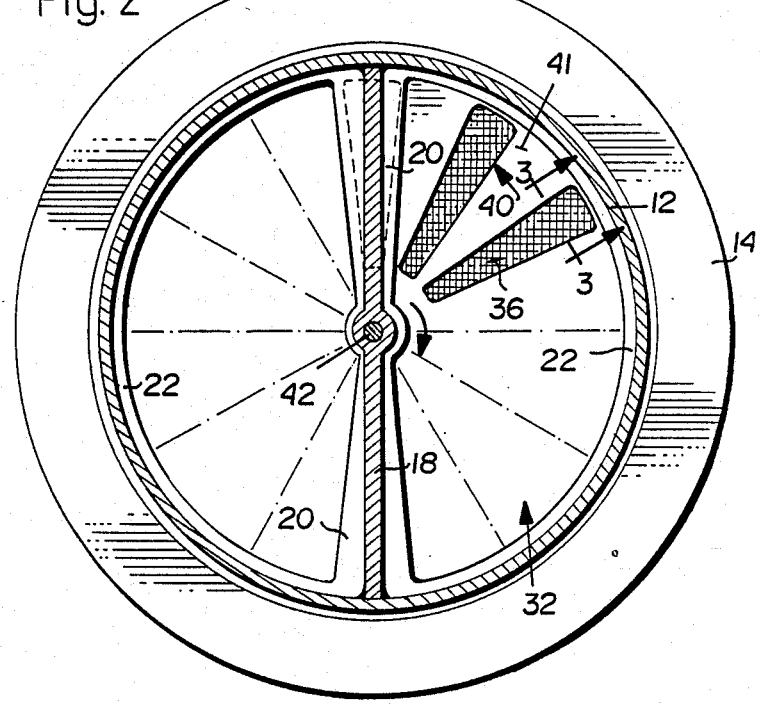
FIG. 2 is a cross-sectional view taken along lines 2—2 of FIG. 1.

The screening assembly 10 exemplarly illustrated in FIGS. 1 through 3, includes a liquid tight pressure resistant vessel 11 defining an open interior. The vessel is preferably formed in two sections 12, 13, each having a peripheral lip 14, 15, respectively with an annular gasket 16 clamped between the lips 14, 15. Bolts, clamps, or any other suitable conventional means can be utilized to hold the vessel halfs 12, 13 together at the lips 14, 15 so that the vessel is liquid tight.

While the shape of the vessel 11 is not particularly significant, since superatmospheric pressure will be applied, and since the pressure may be on the order of 10 bar, the vessel 11 preferably takes the shape of a flattened spherical or ellipsoidal shell (as illustrated in FIG. 1) so that it has sufficient strength.

The assembly 10 also includes partition means for dividing the vessel open interior into first and second distinct chambers. The partition means preferably take the form of the partition wall 18 located in the vessel half 12, and the partition wall 19 located in the vessel half 13. These walls 18, 19 extend the entire width of the vessel portions 12, 13, respectively and separate the interior into distinct chambers that are isolated from each other except at a slit between the partition walls 18, 19. Associated with the walls 18, 19 preferably are flanges 20, 21, respectively, while the interior periphery of the vessel portions 12, 13 preferably also include annular flanges 22, 23. The first chamber of the vessel 11 is denoted by reference numeral 24 in FIG. 1, while the second chamber is denoted by reference numeral 25.

The assembly 10 further comprises an inlet 26 for a first liquid slurry, and an outlet 27 for the first liquid, the inlet and outlet 26, 27 being connected to the first chamber 24. Operatively connected to the second chamber 25 are an inlet 28 for the second liquid, and an outlet 29 for the second liquid with entrained particles. Inlet 26 and outlet 29 typically are in a common vertical plane, as are outlet 27 and inlet 28.

The assembly 10 further comprises a screening disk means, shown generally by reference numeral 32, for screening particles from the first liquid slurry in the first chamber 24, and allowing the particles to be entrained by the second liquid flow in the second chamber 25. While the screening disk means may take a variety of forms, preferably it is formed as illustrated in the drawings in which a generally circular screen 36 (such as screen cloth or woven metal wire) is sandwiched between generally circular first and second disk plates 34, 35, respectively. The disk plates 34, 35 are solid, except at the portions 38, 39 (see FIG. 3) thereof which define through-extending openings. The walls of the disk plate 34 defining the openings 38, and the screen 36, define pockets 40 in the face of the disk means 32 closest to the inlet 26 and outlet 29, the pockets 40 adapted to capture particles that have been screened out of the first liquid flow through the screen 36. The openings 38, 39 are aligned with each other.

The pockets 40 preferably have a smaller width adjacent the center of the screening disk means 32 than closer to the periphery thereof; that is they have a generally sector-shape as illustrated in FIG. 2. The pockets 40 are preferably spaced evenly along the entire disk means 32, with solid portions 41 of the disk plate 34 disposed between the pockets, with the portiosn 41 having dimensions that are at least as large as the dimensions of the pockets. The disk means 32 is also solid at the portions thereof most closely adjacent to the center of the partition walls 18, 19, and at the peripheral interior flanges 22, 23, of the vessel portions 12, 13.

The disk means 32 are mounted by mounting means 30 so that the disk means essentially fills the slit between the partition walls 18, 19 (see FIG. 1) with portions of the disk 32 disposed in each of the chambers 24, 25, and so that the disk means 32 extends generally transverse to the partition walls 18, 19, and so that the disk means 32 is rotatable about an axis 43 defined by shaft 42, which axle is generally parallel to the partition means 18, 19. The flanges 20 through 23 comprise means for mounting the disk means, engaging both of the disk plates 34, 35 and essentially preventing the passage of liquid between chambers 24, 25. To further facilitate this function, the flanges 20, 21 are formed to have dimensions greater than the dimensions of the pockets 40, and are shaped in essentially the same way as the pockets 40 (i.e. sector-shaped), as can be seen for the flanges 20 in FIG. 2. Note particularly at the top of FIG. 2 wherein a flange 20 is illustrated having a sector shape and having dimensions larger than a pocket 40, which is shown in dotted line therebelow. In this case, each pocket 40 is completely covered by a flange 20 so that it does not communicate with both chambers 24, 25 at the same time (the flanges 20, 21 thus comprising means associated with the partitions 18, 19 so as to prevent such communication).

The assembly 10 also comprises means for rotating the disk means 32 so that points spaced from the axis thereof (e.g. pockets 40) move from one chamber to the other during rotation. The rotating means are connected to the shaft 42, and may comprise any conventional motor. In normal operation, the motor rotating the shaft 42, and thus the disk 32 connected thereto, would continuously rotate the disk 32, and at substantially the same speed during any given treatment operation.

While different arrangements and orientations may be provided, as shown in FIGS. 1 and 2, the shaft 42 may be mounted so that it is received within the partition walls 18, 19, being surrounded by the partition wall 18 throughout the length thereof within the vessel portion 20, and having a free end thereof journalled at 44 in the partition wall 19. It will be seen that the disk 32 (and thus the disk plates 34, 35 forming it) has a diameter slightly greater than the radial distance between opposite portions of the flanges 22, 23, so that the disk 32 is engaged thereby during rotation. There will be some clearance between the disk 32 and the flanges 20 through 23 so that they do not retard the rotation of the disk 32, so that a minor amount of leakage will occur, but such minor leakage is not significant. For example, if the liquid slurry 51 consists of a liquor having a fiber content of 200 ppm, and if the pockets 40 run filled with 10% fiber and 90% liquor, when the transfer of liquid will amount merely to about 0.2% of the liquor flow.

It is further desirable to dimension the pockets 40, and also taking into account the other parameters, so that the pockets 40 are filled with particles when they pass from chamber 24 to chamber 25 so that a minimum amount of liquid will be transferred between them. This is particularly significant where the first and second liquids are entirely different types of treatment liquids, for example in the case of the treatment of pulp, where one liquid is a digesting liquid and the other is a washing liquid. The inlets and outlets 26 through 29 may be connected up to any desired conventional equipment, for example, the inlet 26 could be connected up to the discharge from the continuous digester while the outlet 27 is connected to an evaporator, while the inlet 28 is connected up to a source of wash liquid, while the outlet 29 is connected up to a pressure diffuser or like treatment vessel.

In the embodiment illustrated in FIGS. 1 through 3, the chambers 24, 25 are substantially the same size. That means that during treatment with the assembly 10, if the flows of the first and second liquids are essentially the same and the shaft 42 rotates continuously at approximately the same speed, the consistency of the slurry exiting the outlet 29 will be substantially the same as the consistency of the slurry entering the inlet 26 (e.g. about 6–15%). However according to the present invention by making simple modifications to the assembly 10, or the flow rates, it is possible to have a differential consistency between the slurries. That is the slurry 53 (see FIG. 1) of particles in the second liquid, can be made to have a different consistency (either greater than or less than, but preferably greater than) the consistency of the slurry 50, during opertion of the assembly 10 in which the first liquid flow 51 after particle separation is through the outlet 27, and the second liquid flow 52 is through the inlet 28.

One simple way to accomplish differential consistencies between the slurry inlet and outlet flows is to utilize the assembly 110 illustrated in FIG. 4. In FIG. 4 components comparable to those in the FIGS. 1 through 3 embodiment are illustrated by the same reference numeral ony preceded by a "1".

In the assembly 110, essentially all of the elements are the same as in the FIGS. 1 through 3 embodiment, except for the partition wall means 118, 118' (and comparable partition walls corresponding to the partition wall 19 in the FIG. 1 embodiment, and not shown in FIG. 4). In this embodiment, the walls 118, 118' are disposed at an angle 55 of less than 180° (as in the FIGS. 1 through 3 embodiment), so that one of the chambers is much larger than the other. For the particular relationship between components illustrated in FIG. 4, it will be seen that the first chamber 124 is much larger than the chamber 125, the angle 55 being approximately 36°, so that the chamber 125 is about 10% of the interior volume of the vessel section 112, while the chamber 124 is approximately 90% of the interior volume. Of course any desired ratio between the volumes 124, 125 can be provided in order to accomplish any desired result.

Typically, the flows 50, 51 will be at substantially the same pressure as the flows 52, 53, and at substantially the same rate. However in order to ensure that any leakage of liquid that takes place is in a desired direction, a small pressure difference may be maintained between the chambers, or in some circumstances if it is desired to enhance or reduce the pressure of the slurry a pressure differentiation between the flows 50, 51 on the one hand and 52, 53 on the other may be provided. Minor pressure differences typically result from the flow resistance of the screen 36, but do not typically adversely affect the desired results.

METHOD

In an exemplary method according to the present invention, a slurry of a first liquid and particles 50 passes through inlet 26 into first chamber 24 in a first direction, defined by the continuous flow path between the inlet 26 and outlet 27. Particles in the slurry 50 are captured as it flows in the first direction, in the pockets 40, to separate the particles from the flow. The second liquid 52 is caused to flow in a second direction, defined by the inlet 28 and outlet 29, which second direction is generally opposite to the first direction. The captured particles are moved (by rotating the disk 32) into operative association with the second liquid flow 52, so that the captured particles are entrained in the second liquid and define the second slurry 53. By controlling the rate of the flow 50, 51 with respect to the rate of the flow 52, 53, and/or by providing a differential dimension between the chambers (e.g. chambers 124, 125), it is possible to either thicken or dilute the slurry; for example, when the assembly 110 is utilized and the disk 132 is rotated continuously at approximately the same speed, and the flow rates are the same, the slurry 53 will have a significantly greater consistency than the slurry 50, the relative consistency being precisely calculatable based upon the relative chamber dimensions, flow rates, and the like (e.g. approximately a 10 fold increase when the apparatus 110 is utilized with matching flows).

The method is particularly desirable for replacing one treatment liquid which entrains comminuted cellulosic fibrous material (e.g. at a consistency of about 6–15%) with a second, distinct, treatment liquid, such as replacing a digesting liquid with a wash liquid, or a wash liquid with a bleaching liquid.

Normally, the assembly 10 will be disposed so that the flows 50 through 53 are vertical, with the flows 50, 51 downward and the flows 52, 53 upward. However a wide variety of other orientations may also be utilized, such as by making all of the flows horizontal, or tilting the assembly 10 so that the flows are inclined, and by switching positions of inlets and outlets associated with a particular chamber, etc.

While the invention has been herein shown and described in what is presently conceived to be the most practical and preferred embodiment thereof, it will be apparent to those of ordinary skill in the art that many modifications may be made thereof within the scope of the invention. For example, the vessel 11 may be cylindrical in shape with dome shaped tops and bottoms, and abutments provided to prevent deformation of the screen disk. The screen 36 could be formed—instead of by woven metallic wire cloth—from thin perforated or slitted metallic plates. Further, the interior of the vessel may be divided into more than two chambers, such as four chambers, so that the flows are alternately directed upwardly and downwardly so that the pressure upon the disk 32 is distributed over the circumference and is mutually compensated. These and other modifications are intended to be within the scope and spirit of the intended claims.

What is claimed is:

1. A screening assembly for separating out particles contained in a first liquid slurry and introducing them into a second liquid flow, while maintaining the particles and liquid under superatmospheric pressure, comprising:

a liquid tight pressure resistant vessel defining an open interior;

partition means for dividing said vessel open interior into first and second distinct chambers so that the chambers are isolated from each other except for means defining a slit in a mid portion thereof;

an inlet for the first liquid slurry, and an outlet for the first liquid, operatively connected to said first chamber;

an inlet for the second liquid, and an outlet for the second liquid with entrained particles, operatively connected to said second chamber;

screening disk means for screening particles from the first liquid slurry in the first chamber, and allowing the particles to be entrained by the second liquid flow in the second chamber;

means for mounting said disk drive means so that it essentially fills said slit, with portions thereof disposed in each of said first and second chambers, and so that it extends generally transverse to said partition means, and is rotatable about an axis generally parallel to said partition means; and means for rotating said disk means so that points spaced from the axis thereof move from one chamber to the other during rotation.

2. An assembly as recited in claim 1 wherein said screening disk means comprises means defining a plurality of pockets in a face of said disk means closest to said first chamber inlet and said second chamber outlet, with a screen disposed in each pocket so that liquid will pass through said disk means at each pocket, but particles above a predetermined size will not.

3. An assembly as recited in claim 2 wherein said disk means further comprises a generally circular screen; a first disk plate, and a second disk plate, said disk plates being generally circular, and having means defining a plurality of through-extending openings therein, each opening having a smaller width closer to said axis of rotation than further from said axis; and said disk plates sandwiching said screen therebetween, with the openings in said plates aligned with each other and separated by said screen; said means defining said pockets comprising said means defining openings in said first plate, and said screen.

4. An assembly as recited in claim 3 wherein said means for mounting said disk means includes flanges extending radially outwardly from said partition means, and radially inwardly from said vessel, engaging both said first and second disk plates.

5. An assembly as recited in claim 1 wherein said partition means comprise means for dividing said vessel open interior into first and second distinct chambers that are of approximately the same size.

6. An assembly as recited in claim 1 wherein said partition means for dividing said vessel open interior into first and second distinct chambers divides the interior so that said first chamber is much larger than said second chamber.

7. An assembly as recited in claim 7 wherein said means for mounting said disk means comprises a shaft defining said axis of rotation and received by said partition means, and wherein said means for rotating said disk means rotates said disk means substantially continuously during operation.

8. An assembly as recited in claim 1 wherein said means for mounting said disk means comprises a shaft defining said axis of rotation and received by said partition means, and wherein said means for rotating said disk means rotates said disk means substantially continuously during operation.

9. An assembly as recited in claim 1 wherein said first liquid slurry inlet and said outle for the second liquid with entrained particles are in a common plane and are disposed in the vessel on the same side of the disk means, and on opposite sides of said partition means.

10. An assembly as recited in claim 9 wherein said outlet for the first liquid and the inlet for the second liquid are disposed in a common plane, and are disposed in the vessel on the same side of the disk means and on opposite sides of the partition means, and are both disposed on an opposite side of the disk means from the first liquid slurry inlet and the second liquid with entrained particles outlet.

11. An assembly as recited in claim 3 wherein said first disk plate is solid at the portions thereof adjacent said partition means at said axis of rotation, and at peripheral portions thereof.

12. An assembly as recited in claim 2 wherein said disk means are solid between said pockets, and wherein the solid portions of said disk means between said pockets have an arcuate extent at least as great as the arcuate extent of said pockets.

13. An assembly as recited in claim 12 further comprising means associated with said partition means for preventing communication of a pocket with both said first and second chambers at the same time, said means comprising abutment means for engaging said face of said disk means closest to said first chamber inlet and said second chamber outlet that is large enough and shaped to cover completely each of said pockets as it passes in association therewith when moving from one chamber to the other.

14. An assembly as recited in claim 13 wherein each of said pockets are sector shaped, and said means associated with said partition comprises sector shaped flanges.

15. An assembly as recited in claim 1 wherein said means for mounting said disk includes a shaft enclosed within said partition means.

16. A screening assembly for separating out particles contained in a first liquid slurry and introducing them into a second liquid flow, comprising:
a liquid tight vessel defining an open interior;
a rotatable element;
partition means for dividing said open interior into first and second distinct chambers so that the chambers are isolated from each other except for means defining an opening for receipt of said rotatable member, said first chamber being much larger than said second chamber;
an inlet for the first liquid slurry, and an outlet for the first liquid, operatively connected to said first chamber;
an inlet for the second liquid, and an outlet for the second liquid with entrained particles, operatively connected to said second chamber;
screening means associated with said rotatable element for screening particles from the first liquid slurry in the first chamber and allowing the particles to be entrained by the second liquid flow in the second chamber;
means for mounting said rotatable element so that it essentially fills said opening, with portions thereof disposed in each of said first and second chambers, and so that screening portions thereof communicate with only one chamber at a time; and
means for rotating said rotatable element so that the screening portions thereof move from one chamber to the other.

* * * * *